No. 857,817.

PATENTED JUNE 25, 1907.

W. R. MARTIN.
EXCAVATOR.
APPLICATION FILED AUG. 21, 1906.

WITNESSES:

William R. Martin, INVENTOR.

By C. A. Snow & Co.
ATTORNEYS

THE NORRIS PETERS CO., WASHINGTON, D. C.

UNITED STATES PATENT OFFICE.

WILLIAM RILEY MARTIN, OF IDAHO FALLS, IDAHO.

EXCAVATOR.

No. 857,817.  Specification of Letters Patent.  Patented June 25, 1907.

Application filed August 21, 1906. Serial No. 331,506.

*To all whom it may concern:*

Be it known that I, WILLIAM RILEY MARTIN, a citizen of the United States, residing at Idaho Falls, in the county of Bingham and State of Idaho, have invented a new and useful Excavator, of which the following is a specification.

This invention has relation to excavators and it consists in the novel construction and arrangement of its parts as hereinafter shown and described.

The object of the invention is to provide an excavator which is simple in construction and embraces a minimum number of parts.

Figure 1:
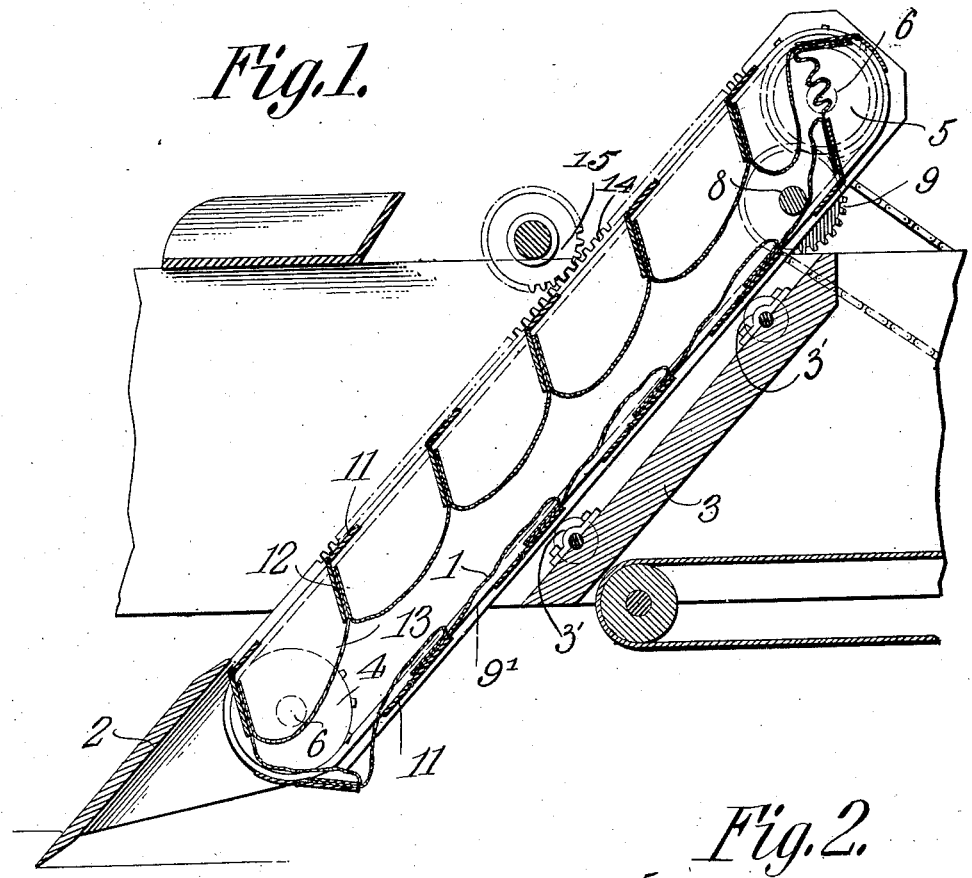
Figure 2:
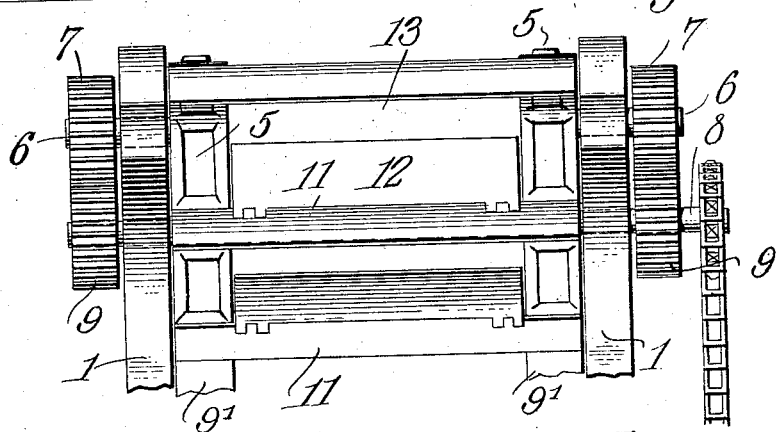

In the accompanying drawing:—Figure 1 is a vertical sectional view of the excavator. Fig. 2 is a rear elevation of the upper portion of the same.

The sides 1, 1 are connected together at their lower ends by the cutter 2. The said sides are mounted upon the rollers 3′ journaled in the frame 3. The sprocket wheels 4 are journaled upon the inner surfaces of the said sides 1 and near the lower ends thereof. The sprocket wheels 5 are journaled upon the inner surfaces of the said sides 1 near the upper ends thereof. The shafts 6, 6 pass transversely through the said sides 1 and the said sprocket wheels are attached to the inner ends thereof. The gear wheels 7 are fixed upon the shafts 6 and are located adjacent the outer surfaces of the sides 1. The shaft 8 is journaled in the said sides 1 and is provided with the gear wheels 9 which mesh with the gear wheels 7. Any suitable means may be employed for rotating the shaft 8. The sprocket chains 9′ pass around the wheels 4 and 5 and the cross-bars 11 connect the said chains together. Each said cross-bar is provided at one edge with the hinged flap 12 and attached to the said flap is an apron 13 which also attaches with the flap of the adjacent cross-bar, said aprons are also connected at their ends to the chains 9′ thus constituting flexible buckets. The shaft 8 extends transversely across the excavator and is located in the path of the bottoms of the flexible buckets in their descent along the upper end of the frame 3 and pushes the hinged flaps 12 and the aprons 13 out.

The operation of the excavator is as follows: The earth is cut by the plow or cutter 2 and is shunted in an upward direction into the buckets formed by the apron 13 and, as the chains 11 move over the sprocket wheels 4 and 5, the said buckets and earth contained therein are elevated and deposited at the upper end of the conveyer into the body portion thereof. The sides 1 are provided with the racks 14 with which the pinions 15 mesh and afford means for adjusting the excavator longitudinally.

Having described my invention, what I claim as new and desire to secure by Letters Patent is:—

1. An excavator comprising sides, a cutting plow attached to the lower ends thereof, sprocket wheels journaled to said sides, chains passing around said wheels, flexible buckets located upon said chains, and a shaft extending across the excavator and engaging said buckets as they pass.

2. An excavator comprising sides, a plow attached to the lower ends thereof, sprocket wheels journaled upon the sides, chains passing around said wheels, cross-bars connecting said chains together, flaps hinged to the said bars, and aprons connecting said flaps together.

3. An excavator comprising sides, chains mounted for movement along the said sides, cross-bars connecting said chains together, flaps hinged to said cross-bars, and aprons connecting the said flaps together.

4. An excavator comprising sides, chains mounted for movement along said sides, cross-bars connecting said chains together, flaps hinged to said cross-bars, and aprons attached at their edges to the flaps of adjacent bars and at their ends to said chains.

In testimony that I claim the foregoing as my own, I have hereto affixed my signature in the presence of two witnesses.

WILLIAM RILEY MARTIN.

Witnesses:
 OLIVER J. ELLIS,
 R. DONNELL LARABIE.